W. B. CURTIS.
TRAP.
APPLICATION FILED AUG. 29, 1916.

1,227,395.

Patented May 22, 1917.
2 SHEETS—SHEET 1.

Witnesses
Frederick W. Ely
Frank Hough

Inventor
W. B. Curtis.
By Victor J. Evans
Attorney

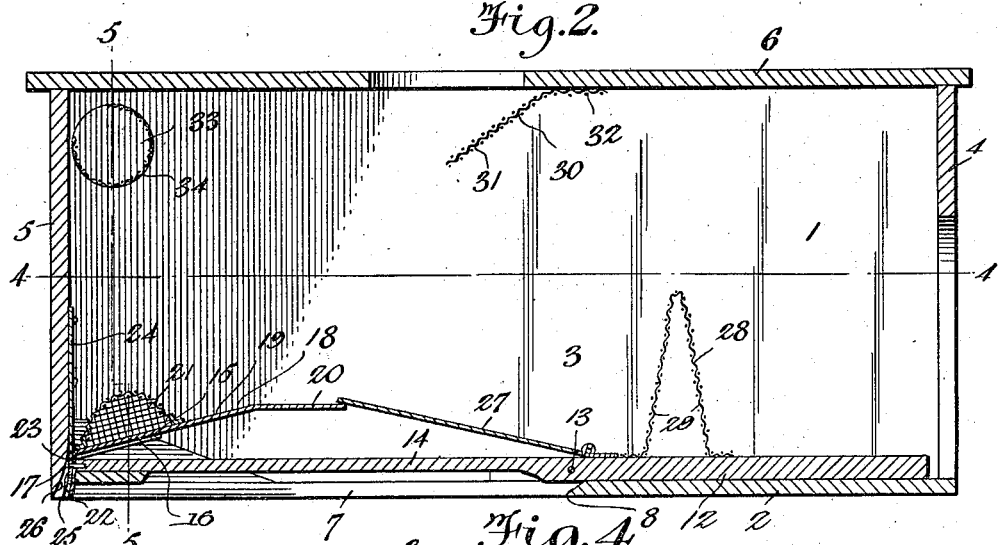
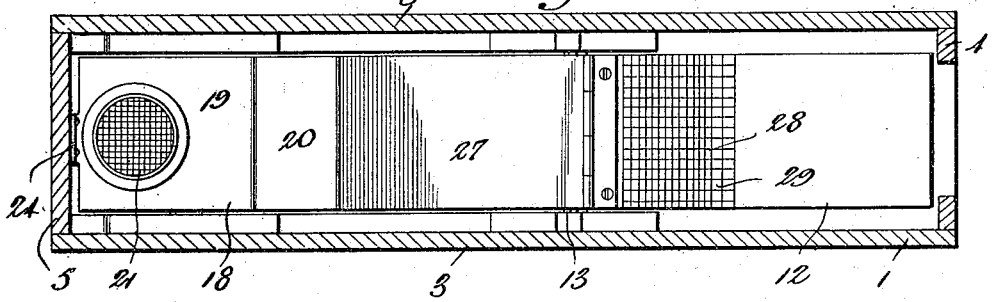
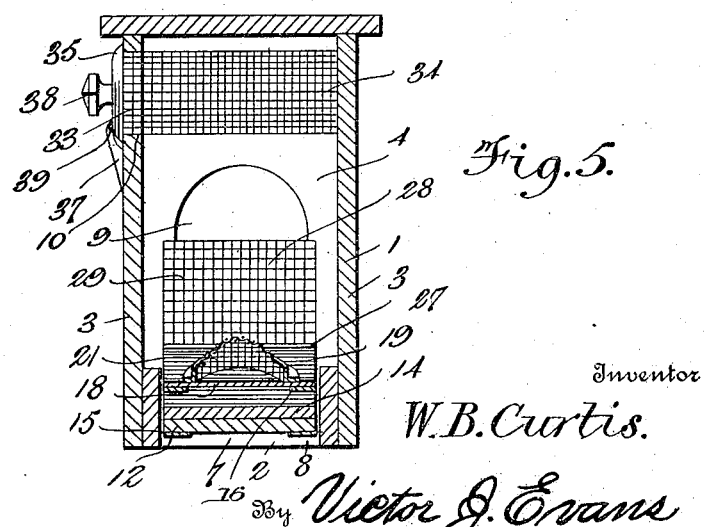

UNITED STATES PATENT OFFICE.

WALLACE B. CURTIS, OF HAMBURG, NEW YORK.

TRAP.

1,227,395.      Specification of Letters Patent.      Patented May 22, 1917.

Application filed August 29, 1916. Serial No. 117,512.

*To all whom it may concern:*

Be it known that I, WALLACE B. CURTIS, a citizen of the United States, residing at Hamburg, in the county of Erie and State of New York, have invented new and useful Improvements in Traps, of which the following is a specification.

This invention relates to a trap and more particularly to a trap which may be used to exterminate rats and mice.

The primary object of the invention is to provide a trap of the class described which may be supported upon a receptacle filled with water and is provided in the bottom thereof with an opening normally closed by a platform which will be moved to an inclined position by the weight of an animal within the trap to cause the animal to be precipitated into the receptacle upon which the trap is supported.

Another object of the invention is to provide the trap with a latch so arranged that the platform upon its return to normal position will engage therewith and be held in set condition until again released by the weight of an animal within the trap.

A further object of the invention is to provide the platform with a supplemental tread engageable with the latch which holds the platform in normal position and operable to release the platform from the latch by a primary tread carried by the platform and over which the animal must pass in its endeavor to reach the bait in a cage on the supplemental tread.

A still further object of the invention is to provide the trap body and platform with baffle members so arranged with relation to the treads on the platform that an animal in its endeavor to reach the bait carried by the supplemental tread will be caused to jump either upon the primary tread or the supplemental tread thus releasing the platform from the latch and causing the animal to be precipitated into the receptacle upon which the trap is supported.

With these and other objects in view, the invention resides in the novel combination and arrangement of parts which will be hereinafter described and particularly pointed out in the claims.

The preferred embodiment of the invention has been illustrated in the accompanying drawing, although no restriction is necessarily made to the precise details of construction therein shown, as changes, alterations, and modifications within the scope of the claims may be resorted to when desired.

Like characters of reference denote corresponding parts throughout the several views in the drawing, in which:

Fig. 2 is a vertical longitudinal section therethrough.

Fig. 4 is a horizontal longitudinal sectional view on the line 4—4 of Fig. 2.

Fig. 5 is a transverse sectional view on the line 5—5 of Fig. 2.

Figure 1:
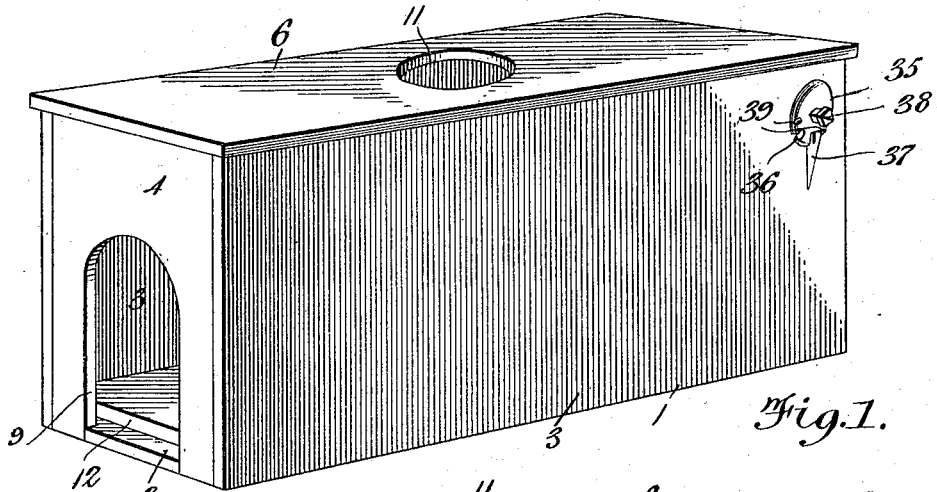
Figure 1 is a perspective view of a trap constructed in accordance with the invention.
Figure 3:
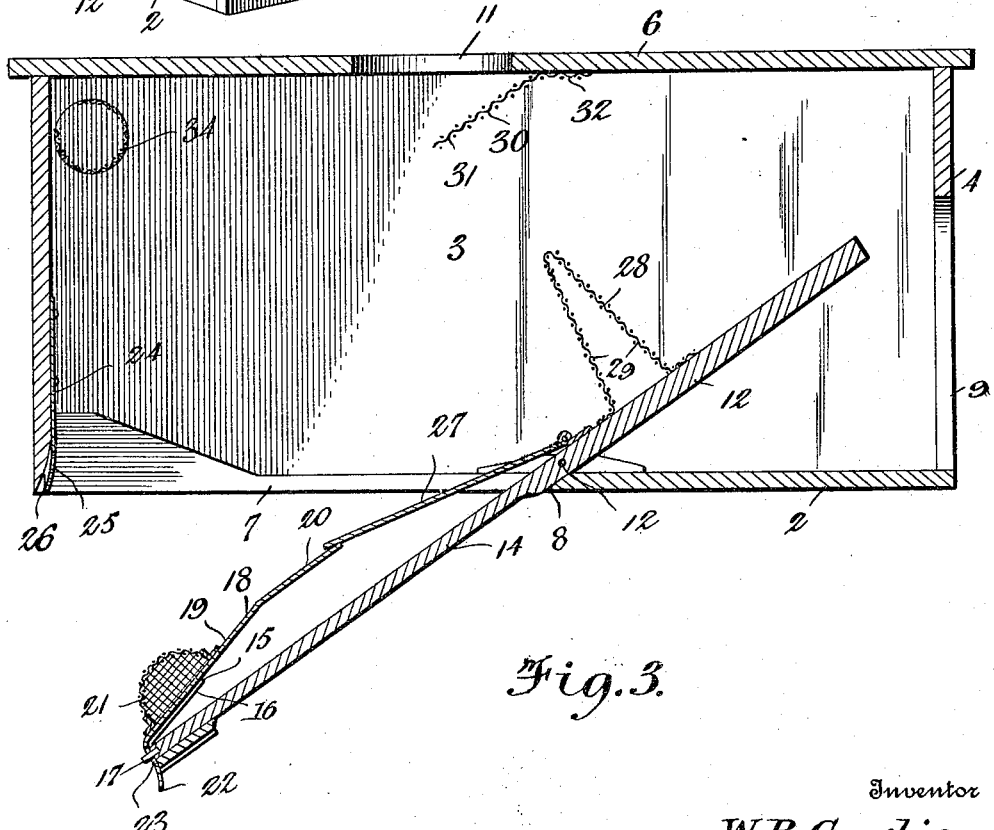
Fig. 3 is a view similar to Fig. 2 showing the platform in an inclined position.

Referring now to the drawing in detail, the numeral 1 designates the trap body which is rectangular in shape and comprises a bottom 2, side walls 3, end walls 4 and 5, and a top 6.

The bottom 2 has extending from the end wall 5 for the greater portion of its length, an opening 7 terminating at one end in a beveled face forming a stop shoulder 8. The end wall 4 has formed therein for the greater portion of its height an entrance opening 9 while one of the side walls 3 has formed therein near the end wall 5 and top 6 a circular opening 10. The top 6 is provided between its ends with a circular entrance opening 11.

A platform 12 is arranged upon the bottom 2 and extends the entire distance between the end walls 4 and 5 and has passing transversely therethrough between its ends a shaft 13 journaled in the side walls 3 of the trap body. The portion of the platform 12 which over-lies the opening 7 is reduced in thickness, as at 14, to enable the portion of the platform which over-lies the bottom 2 to counter-balance the weight of the reduced portion of the platform when the same is moved to an inclined position thus causing the platform to normally lie horizontal within the trap body.

The end of the platform which is arranged adjacent the end wall 5 has connected therewith spaced supporting members 15 formed from resilient material and bent in U-form to provide arms 16 arranged to overlie the upper face of the platform 12 and extend toward the entrance opening 9 in the end wall 4.

A pin 17 is connected with the platform between the arms 16 and extends laterally therefrom toward the end wall 5.

A supplemental tread 18 which is rectangular in shape is bent between its ends to form oppositely inclined sections 19 and 20 with one end of the section 19 secured to the arms 16 of the supporting member 15 which hold the supplemental tread in spaced relation with the upper face of the platform 12.

The section 19 has removably connected therewith a bait cage 21 and is further provided at its free end with a depending tongue 22 slotted, as at 23, to receive the pin 17.

A strip of resilient material forming a latch 24 has one end secured to the end wall 5 interiorly of the trap body and above the supplemental tread 18, the other end of said strip extending to the bottom of the tongue 22 with which it contacts and is provided with an opening 25 in which is received an end on the pin 17 when the platform 12 is in normal position. The lower portion of the strip forming the latch 24 below the opening 25 is curved toward the back of a recess 26 near the bottom of the end wall 5, so that when the platform 12 returns to normal position after having been tilted the end of the pin 17 will engage said curved end in the free end of the latch and force the same into said recess until the end of the pin 17 is received in the opening 25.

Through the above described arrangement of the supplemental tread and tongue thereon with relation to the pin 17 and latch 24, it will be seen that when the inclined portion 20 of the supplemental tread has been depressed against the influence of the arms 16, the tongue 22 will release the lower end of the latch member from the pin 17 so that the platform 12 will be free to tilt.

A main tread 27 is hingedly connected with the platform 12 adjacent its pivotal connection with the side walls 3 and has the end thereof which extends toward the end wall 5 over-lying an end on the section 20. Arranged on the platform 12 between the hinged end of the main tread 27 and the entrance opening 9 in the end wall 4 is a baffle member 28, said member being formed from a strip of wire fabric bent in U-form to provide spaced and downwardly diverging arms 29, the free ends of which are secured to the upper face of the platform 12.

A baffle member 30 which is formed from a strip of wire netting bent between its ends to provide oppositely inclined sections 31 and 32 has the section 31 arranged to under-lie a portion of the entrance opening 11 in the top 6 and has the section 32 thereof connected with the under face of said top adjacent the opening.

A head 33 has secured thereto a bait holder 34 formed from wire netting and substantially semi-circular in shape in cross section and adapted to extend transversely of the trap body when said head is positioned in the opening 10 in the side wall 3.

The head 33 is provided with an upstanding flange 35 adapted to contact with the outer face of the side wall 3, said flange having formed therein a recess 36 which when brought into registration with a locking lug 37 on the outer face of the side wall 3 enables the bait holder to be removed from the interior of the trap body.

The head 33 has formed thereon a handle 38 and is further provided on the outer face of the flange 35 with spaced pins 39 which contact with the lug 37 and prevent the bait holder from being turned to a position in which an animal in the trap could gain access to the contents of the holder through the filling opening therein.

When the trap is in use, it is placed upon an open mouthed receptacle containing water and the rodents being attracted to the trap by the smell of the bait in the holder 34 enter the trap through the openings 9 and 11.

The animals which enter the trap through the opening 9 step upon the platform 12 and are confronted by the baffle member 28 through which the bait on the supplemental tread 18 is plainly visible. To reach the bait the animal must climb upon the baffle member and is prevented from springing upon the bait holder 24 by the section 31 of the baffle 30 so that in its endeavor to reach the bait on the supplemental tread, the animal springs upon the main tread 27.

The free end of the main tread being depressed under the weight of the animal depresses the supplemental tread 18 against the influence of the arms 16 and causes the tongue 22 to move the end of the latch member 24 from engagement with the pin 17 at which time the weight of the animal counter-balances the end of the platform 12 over-lying the bottom 2 and causes the platform to be moved to an inclined position, whereupon the animal unable to hold to the platform slips into the water in the receptacle and is drowned.

As the end of the platform which over-lies the bottom 2 is heavier than the portion of the platform which normally covers the opening 7, the platform returns to its normal position and the pin 17 automatically engages the latch member 24 and in this manner the trap is reset.

The animals which enter the trap through the opening 11 are prevented from springing upon the end of the platform which over-lies the bottom 2 or upon the baffle member 28 and are compelled to drop upon the main tread 27 or upon the supplemental tread 18 either of which under the weight of the animal will release the platform from engagement with the latch 24 and cause the animal to be precipitated into the water in the receptacle upon which the trap is supported.

Should an animal enter the trap whose weight is not sufficient to depress the treads sufficiently far to release the platform from the latch 24, the animal will be attracted by the bait in the holder 34 and in its endeavor to reach the same by jumping for the bait will cause the treads to release the platform from the latch.

From the foregoing description, taken in connection, with the accompanying drawings, it is at once apparent that a trap for the purpose set forth has been provided which although simple in construction and therefore inexpensive of manufacture is highly efficient in use.

Having thus described the invention, what is claimed as new, is:

1. A trap comprising a body, a platform mounted to turn in said body, a pin extending beyond an end on said platform, a latch member carried by the body and having an end provided with an opening to receive said pin, supporting members connected with the platform upon opposite sides of said pin, a supplemental tread carried by the supporting members and arranged in spaced relation with the platform, means carried by the platform and operable to depress the supplemental tread against the influence of the supporting members, and a tongue on said tread interposed between the end on the latch member and the end of the platform and having a slot thereon receiving said pin.

2. A trap comprising a body, a platform mounted to turn therein, a latch normally engaged with said platform to lock the same against turning movement, resilient arms overlying said platform and connected with an end thereof, a supplemental tread above said platform having connection with said arms and operable under the weight of an animal to release the latch from engagement with the platform, baffles on said platform and body spaced from said supplemental tread, and a primary tread supported in an inclined position on said platform by the supplemental tread and in the rear of said baffles and operable under the weight of an animal to operate the supplemental tread.

In testimony whereof I affix my signature.

WALLACE B. CURTIS.

Copies of this patent may be obtained for five cents each, by addressing the "Commissioner of Patents, Washington, D. C."